(12) United States Patent
Cheng et al.

(10) Patent No.: US 12,671,247 B2
(45) Date of Patent: Jun. 30, 2026

(54) CONSTANT POWER ADAPTIVE CURRENT LIMITING PROTECTION CIRCUIT AND CONSTANT POWER ADAPTIVE CURRENT LIMITING PROTECTION CIRCUIT METHOD

(71) Applicant: CHROMA ATE INC., Taoyuan City (TW)

(72) Inventors: Chun-Tai Cheng, Taoyuan City (TW); Szu-Chieh Su, Taoyuan City (TW); Chia-Hao Hsu, Taoyuan City (TW)

(73) Assignee: CHROMA ATE INC., Taoyuan City (TW)

( * ) Notice: Subject to any disclaimer, the term of this patent is extended or adjusted under 35 U.S.C. 154(b) by 174 days.

(21) Appl. No.: 18/811,343

(22) Filed: Aug. 21, 2024

(65) Prior Publication Data
US 2025/0219396 A1 Jul. 3, 2025

(30) Foreign Application Priority Data
Dec. 27, 2023 (TW) .................................. 112151144

(51) Int. Cl.
*H02H 9/02* (2006.01)
*H02H 1/00* (2006.01)
(Continued)

(52) U.S. Cl.
CPC ............ *H02H 9/02* (2013.01); *H02H 1/0007* (2013.01); *H02H 7/1213* (2013.01); *H02M 1/32* (2013.01)

(58) Field of Classification Search
CPC ............ H02H 9/02; H02H 9/025; H02M 1/32
See application file for complete search history.

(56) References Cited

U.S. PATENT DOCUMENTS 7,933,732 B2 * 4/2011 Kao .................. G01R 31/31721
                                                      702/108
8,779,746 B2 * 7/2014 Ye .......................... H02M 3/156
                                                      323/285
(Continued)

FOREIGN PATENT DOCUMENTS

CN         103997215 A  * 8/2014

OTHER PUBLICATIONS

Translation of CN103997215A. Aug. 20, 2014. (Year: 2014).*

*Primary Examiner* — Thienvu V Tran
*Assistant Examiner* — Christopher J Clark
(74) *Attorney, Agent, or Firm* — Birch, Stewart, Kolasch & Birch, LLP

(57) ABSTRACT

A constant power adaptive current limiting protection circuit includes a switching power supply circuit, a detecting circuit, and a controlling circuit. The switching power supply circuit has at least one power switch assembly and an output terminal. The detecting circuit is coupled to the output terminal of the switching power supply circuit to detect an output voltage and an output current of the power signal. The controlling circuit is coupled to the switching power supply circuit and the detecting circuit. The controlling circuit is configured to output the PWM signal, calculate a current limiting threshold based on a protection power and the output voltage, and selectively execute a protecting action based on comparison between the output current and the current limiting threshold. The protecting action is adjusting the PWM signal, so as to limit the output power of the switching power supply circuit to below the protection power.

10 Claims, 9 Drawing Sheets

(51) Int. Cl.
      *H02H 7/12*           (2006.01)
      *H02M 1/32*           (2007.01)

(56)                 References Cited

U.S. PATENT DOCUMENTS

2010/0277139 A1*  11/2010  Huang  ............... H05B 41/3928
                                              323/234
2014/0159508 A1*   6/2014  Sankar  .................... H02J 7/485
                                            307/149

* cited by examiner

P1
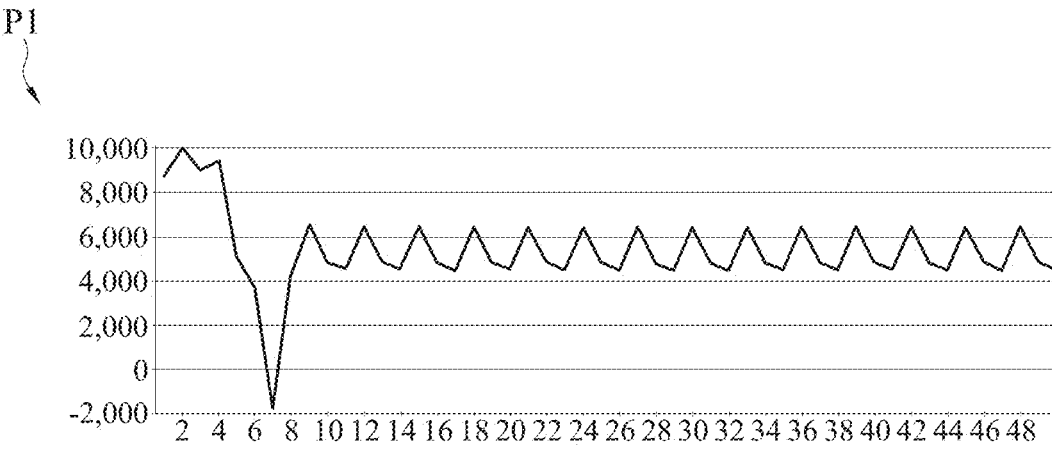
P2
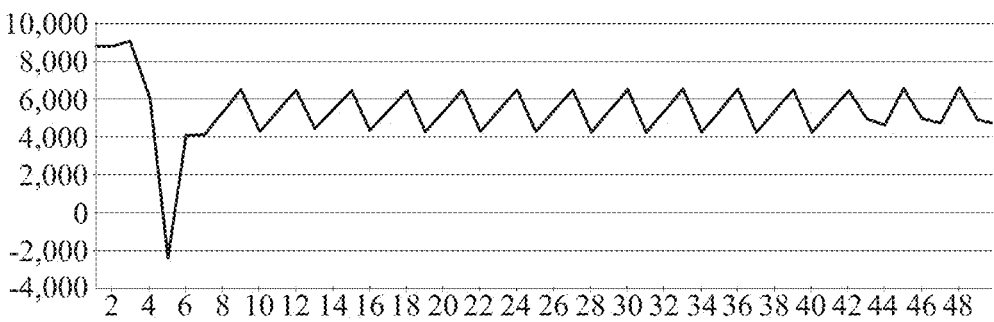
P3
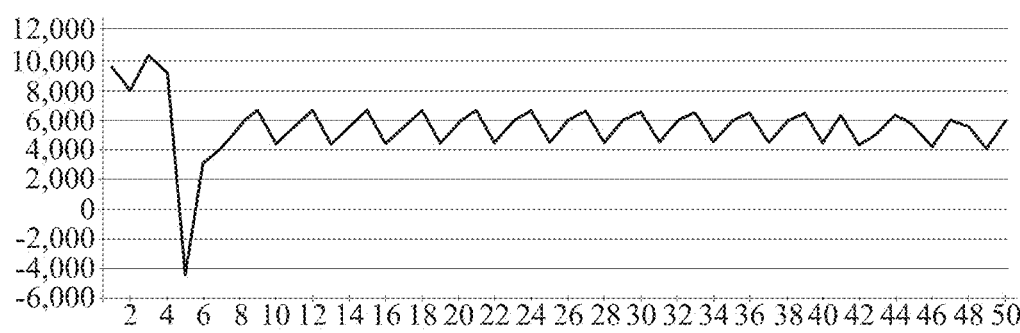
FIG. 7

S80

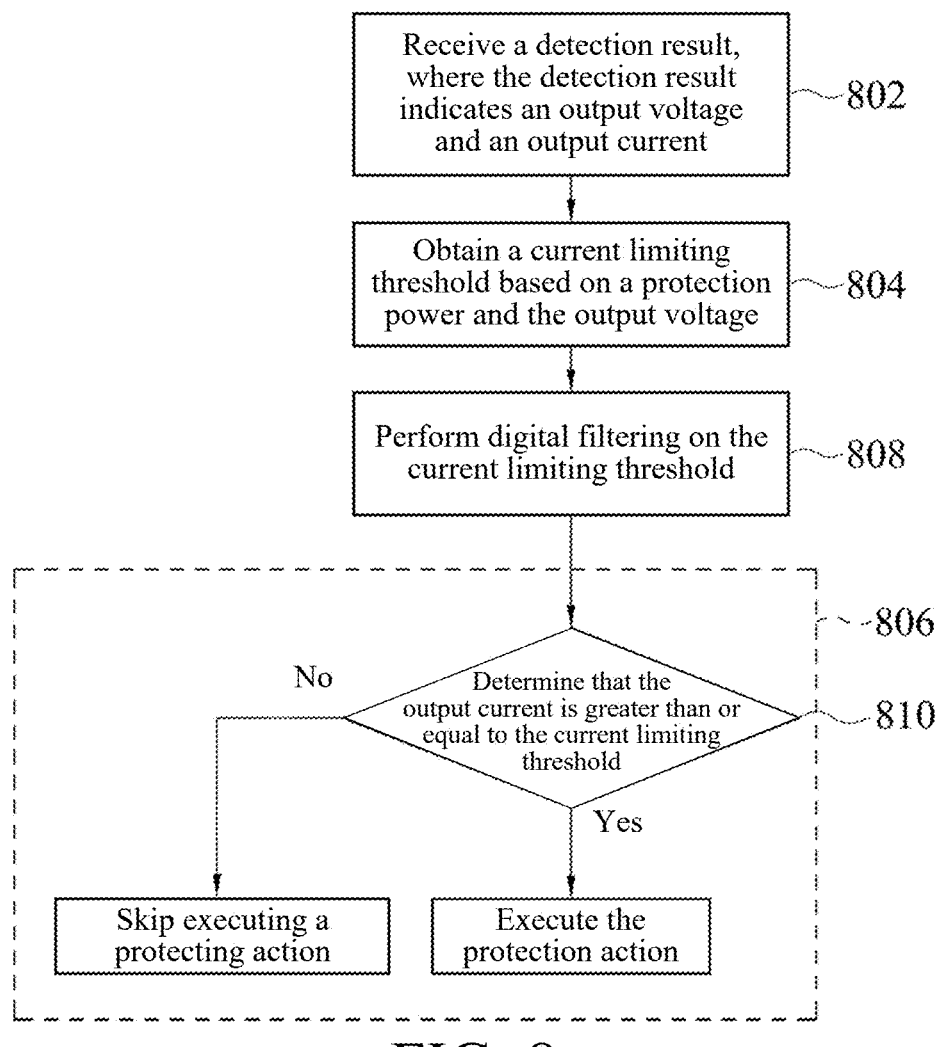

Receive a detection result, where the detection result indicates an output voltage and an output current ~802

Obtain a current limiting threshold based on a protection power and the output voltage ~804

Perform digital filtering on the current limiting threshold ~808

~806

No

Determine that the output current is greater than or equal to the current limiting threshold ~810

Yes

Skip executing a protecting action

Execute the protection action

FIG. 8

CONSTANT POWER ADAPTIVE CURRENT LIMITING PROTECTION CIRCUIT AND CONSTANT POWER ADAPTIVE CURRENT LIMITING PROTECTION CIRCUIT METHOD

CROSS-REFERENCE TO RELATED APPLICATION

This non-provisional application claims priority under 35 U.S.C. § 119 (a) to patent application No. 112151144 filed in Taiwan, R.O.C. on Dec. 27, 2023, the entire contents of which are hereby incorporated by reference.

BACKGROUND

Technical Field

The present invention relates to overcurrent protection technologies, and in particular, to a constant power adaptive current limiting protection circuit and a constant power adaptive current limiting protection method.

Related Art

Direct current (DC) power supplies are constantly striving for high power and wide-range output variations, with power ratios gradually increasing from 1 time to more than 4 times. Therefore, under some testing conditions, existing protection (for example, overcurrent protection) is to fail and unable to effectively protect the circuit. In existing overcurrent protection designs, preset overcurrent protection values are set to a constant value, to protect power elements from damage as a result of overcurrent. However, such designs cannot function correctly under high power ratios. For example, if the DC power supply operates at a low voltage and a high current, the overcurrent protection mechanism may function correctly. However, if the DC power supply operates under high voltage and low current conditions, the protection is not triggered because the current cannot reach the overcurrent protection setting value. However, the overall power of the circuit at this point has exceeded the wattage that the power element can withstand, which may cause damage to the power element.

SUMMARY

In view of this, in some embodiments, the present invention provides a constant power adaptive current limiting protection circuit, including a switching power supply circuit, a detecting circuit, and a controlling circuit. The switching power supply circuit has at least one power switch assembly and an output terminal. The at least one power switch assembly is operated by a pulse-width modulation (PWM) signal to cause the output terminal to output a power signal. The detecting circuit is coupled to the output terminal of the switching power supply circuit to detect an output voltage and an output current of the power signal. The controlling circuit is coupled to the switching power supply circuit and the detecting circuit, and is configured to output the PWM signal, calculate a current limiting threshold based on a protection power and the output voltage, and selectively execute a protecting action based on comparison between the output current and the current limiting threshold. The protecting action is adjusting the PWM signal, so as to limit the output power of the switching power supply circuit to below the protection power.

In some embodiments, when the output current is greater than or equal to the current limiting threshold, the controlling circuit is configured to adjust the PWM signal, so as to limit the output power to below the protection power.

In some embodiments, the controlling circuit is configured to perform digital filtering on the current limiting threshold before the comparison between the output current and the current limiting threshold.

In some embodiments, the protection power is more than twice a maximum power of the switching power supply circuit.

In some embodiments, when a plurality of switching power supply circuits are provided, the controlling circuit is configured to selectively execute the protecting action on each corresponding switching power supply circuit based on the output current of each of the switching power supply circuits and the current limiting threshold.

In some embodiments, a constant power adaptive current limiting protection method is provided, including: receiving, by a controlling circuit, a detection result of a detecting circuit, where the detection result indicates an output voltage and an output current of a switching power supply circuit; obtaining, by the controlling circuit, a current limiting threshold based on a protection power and the output voltage; and selectively executing, by the controlling circuit, a protecting action based on comparison between the output current and the current limiting threshold. The protecting action is adjusting the PWM signal, so as to limit the output power of the switching power supply circuit to below the protection power.

Based on the above, through the constant power adaptive current limiting protection circuit provided in some embodiments of the present invention, the current limiting threshold may be adaptively updated based on an actual output state, so as to accordingly determine whether to execute the protecting action. In addition, when the protecting action needs to be executed, the output power of the power signal is limited to below the protection power. In this way, the following advantages may be provided. First, during the execution of the protecting action, instead of shutting down the entire device, the output current is limited to below the current limiting threshold, so that the output power of the power signal does not exceed the protection power and a normal operation is maintained. Second, the current limiting threshold is calculated based on the output voltage and protection power. This overcurrent protection mechanism may be applied to various devices with constant power ratios (including more than 4 times the constant power ratio), and therefore may be widely used for operation under different voltage conditions or different current conditions. Third, during the execution of the protecting action, the output power does not exceed the protection power. Therefore, an instantaneous power of the overall instrument may be reduced, and the stress of a safe operating area (SOA) of an element may also be reduced.

Detailed features and advantages of the present invention are described in detail in the following implementations, and the content is sufficient for any person skilled in the related art to understand the technical content of the present invention and implement the invention accordingly. According to the content, the patent application scope, and the drawings disclosed in this specification, any person skilled in the related art can easily understand the related objective and advantage of the present invention.

BRIEF DESCRIPTION OF THE DRAWINGS

FIG. 7 shows a power waveform of each phase of a power supply of a three-phase power supply in a comparative example.

FIG. 8 is a flowchart (1) of a constant power adaptive current limiting protection method according to some embodiments of the present invention.

DETAILED DESCRIPTION

Figure 1:
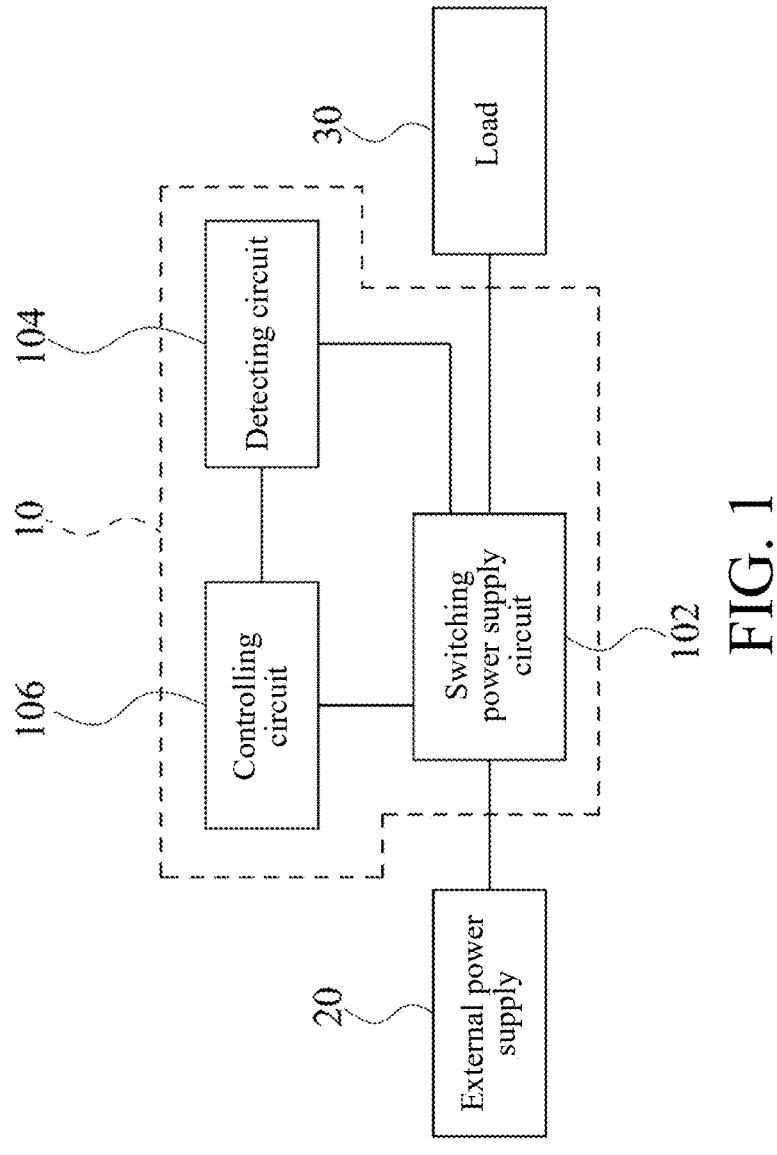
FIG. 1 is a block diagram (1) showing a constant power adaptive current limiting protection circuit according to some embodiments of the present invention, showing that a switching power supply circuit is connected to an external power supply and a load.
Figure 2:
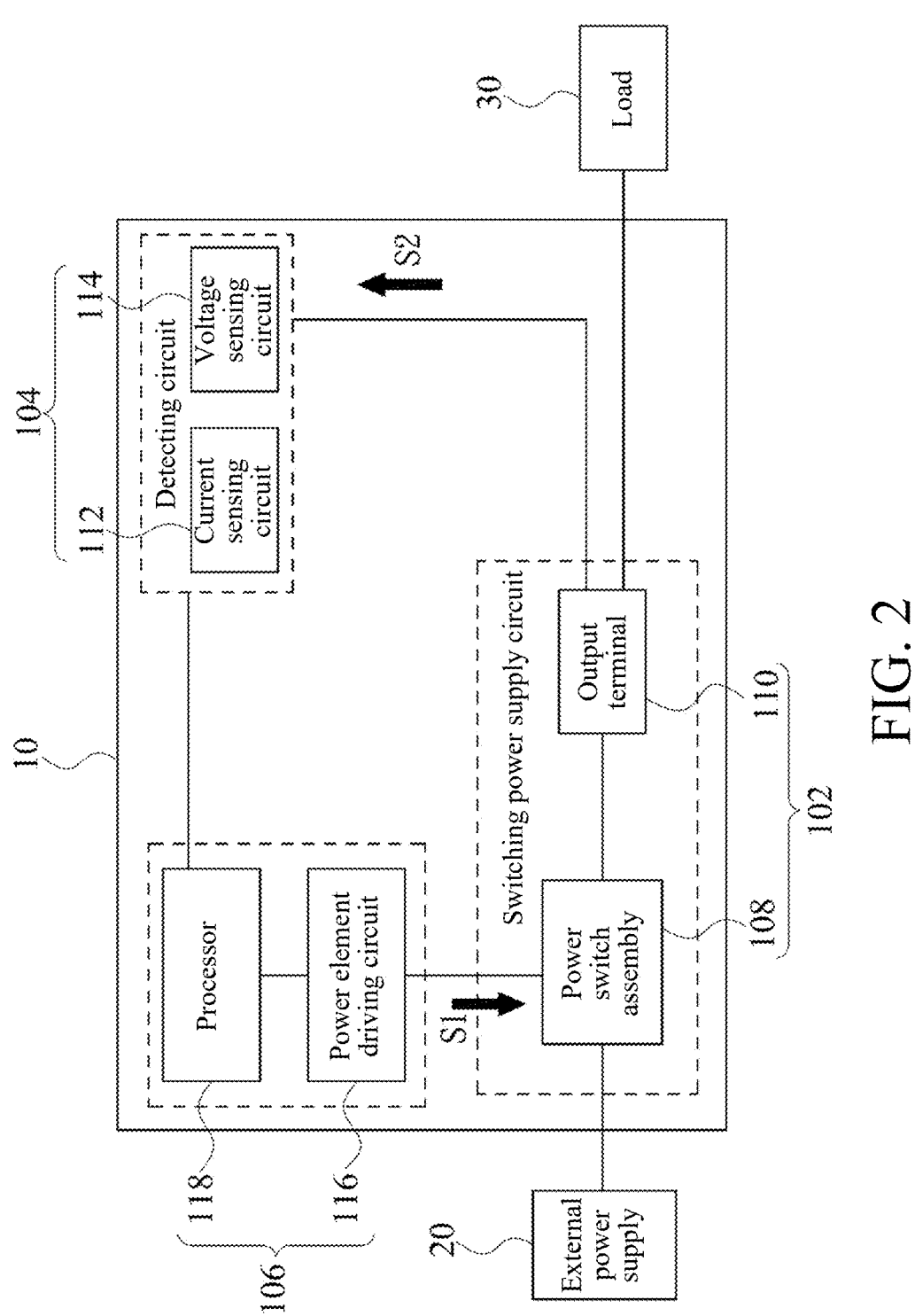
FIG. 2 is a block diagram (2) showing a constant power adaptive current limiting protection circuit according to some embodiments of the present invention.

Refer to FIG. 1 and FIG. 2. FIG. 1 is a block diagram (1) showing a constant power adaptive current limiting protection circuit, showing that a switching power supply circuit is connected to an external power supply and a load. FIG. 2 is a block diagram (2) showing a constant power adaptive current limiting protection circuit according to some embodiments of the present invention. As shown in FIG. 1 and FIG. 2, a constant power adaptive current limiting protection circuit 10 includes a switching power supply circuit 102, a detecting circuit 104, and a controlling circuit 106. The switching power supply circuit 102 has at least one power switch assembly 108 and an output terminal 110. The at least one power switch assembly 108 is operated by a pulse-width modulation (PWM) signal S1, and the output terminal 110 outputs a power signal S2. The detecting circuit 104 is coupled to the output terminal 110 of the switching power supply circuit 102 to detect an output voltage (shown as an output voltage VO in FIG. 3) and an output current (shown as an output current IO in FIG. 3) of the power signal S2. The controlling circuit 106 is coupled to the switching power supply circuit 102 and the detecting circuit 104. The controlling circuit 106 is configured to output the PWM signal S1. The controlling circuit 106 performs a constant power adaptive current limiting protection method, to calculate a current limiting threshold CT (shown as the current limiting threshold CT in FIG. 3) based on a protection power and the output voltage VO, and selectively execute a protecting action based on comparison between the output current (shown as the output current IO in FIG. 3) and the current limiting threshold CT.

As shown in FIG. 2, the switching power supply circuit 102 may receive power from an external power supply 20. The power is converted and outputted to a load 30. The switching power supply circuit 102 may include a multi-stage circuit. Each stage of the circuit may be, but is not limited to, an alternating current-direct current (DC) converter, a DC-AC converter, or a DC-DC converter. In this specification, the DC-DC converter commonly used in a post-stage circuit is used for description. The DC-DC converter may be for example a buck converter, a boost converter, or a buck-boost converter based on an application requirement of a system for a voltage. The buck converter is used as an example, which includes a power switch assembly 108, an inductor, and a capacitor. Herein, the foregoing output current IO is an inductor current, and the output voltage VO is a capacitor voltage. The power switch assembly 108 may be implemented by a power semiconductor switch, for example, a metal oxide semiconductor field-effect transistor or a gate isolation transistor (IGBT). That "the power switch assembly 108 is operated by the PWM signal S1, and the output terminal 110 outputs the power signal S2" means that the power switch assembly 108 is controlled by the PWM signal S1 to adjust a duty ratio of the power switch assembly, so that the output terminal 110 outputs the power signal S2 corresponding to the duty ratio. In some embodiments, the external power supply 20 may be a single-phase power supply or a three-phase power supply (described later).

As shown in FIG. 2 again, in some embodiments, the detecting circuit 104 includes a current sensing circuit 112 and a voltage sensing circuit 114. The current sensing circuit 112 and the voltage sensing circuit 114 are respectively configured to sense a voltage value and a current value of the power signal S2, and provide instant feedback to the controlling circuit 106.

After the controlling circuit 106 receives the voltage value and the current value of the power signal S2, the controlling circuit 106 calculates the current limiting threshold CT based on the protection power and the output voltage VO. The current value may be calculated by dividing the protection power by the output voltage VO, and the controlling circuit 106 may use the current value as the current limiting threshold CT. In addition, the controlling circuit 106 may immediately calculate a new current limiting threshold CT with a change of the output voltage VO in the power signal S2, and determine whether to execute a protecting action on the switching power supply circuit 102. It is to be noted that the protection power may be determined based on a maximum power of the switching power supply circuit 102. The maximum power refers to a rated power of the switching power supply circuit 102. In some embodiments, the protection power may be more than twice the maximum power of the switching power supply circuit 102 (described later). For example, when the maximum power is 6 KW, the protection power may be set to 14 KW.

After the controlling circuit 106 obtains the current limiting threshold CT, the controlling circuit 106 compares the output current IO with the current limiting threshold CT. The foregoing protecting action is adjusting the PWM signal S1. For example, when the output current IO is greater than or equal to the current limiting threshold CT, the controlling circuit 106 adjusts the PWM signal S1. On the contrary, when the output current IO is less than the current limiting threshold CT, the controlling circuit 106 does not adjust the PWM signal S1. Based on the adjusted PWM signal S1, the duty ratio of the power switch assembly 108 changes accordingly, so that the output power (namely, a product of the output voltage VO and the output current IO) of the switching power supply circuit 102 is reduced and limited to below the protection power. Therefore, through execution of the protecting action by the controlling circuit 106, the external power supply 20 or the load 30 connected to the switching power supply circuit 102 may maintain normal operation, rather than forcing the entire device to shut down and causing operation interruption.

As shown in FIG. 2, in some embodiments, the controlling circuit 106 includes a power element driving circuit 116 and a processor 118. The power element driving circuit 116 may be a gate driving circuit, which receives a low-power signal generated by the processor 118 and drives a gate of a power semiconductor switch accordingly to turn on or off the power semiconductor switch. The processor 118 is configured to receive the power signal S2 and the protection power to calculate the current limiting threshold CT, and compare the currently detected output current IO with the current limiting threshold CT, to determine whether the condition for triggering the protecting action is met. The controlling circuit 106 may be for example a microprocessor, a microcontroller, a digital signal processor (DSP), a central processing unit (CPU), a programmable logic controller (PLC), an application specific integrated circuit (ASIC), or a field programmable gate array (FPGA).

Figure 3:
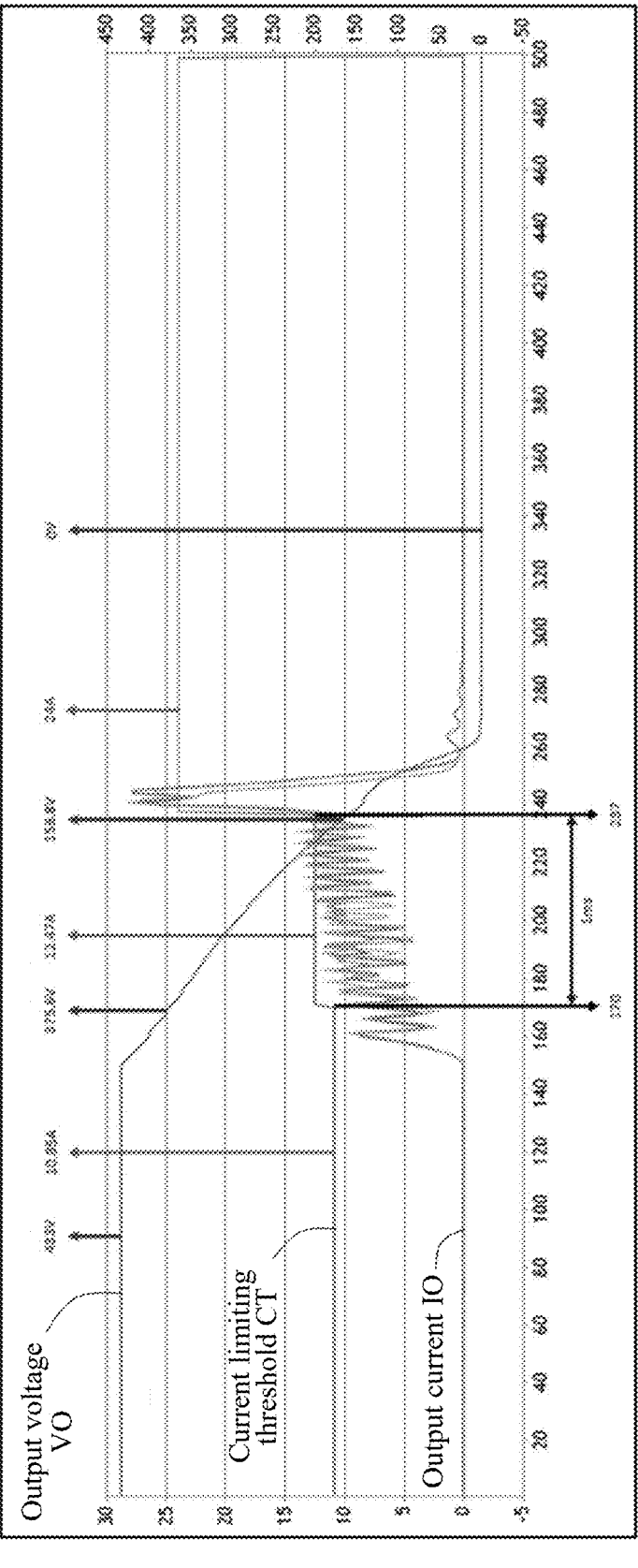
FIG. 3 is a waveform diagram of a power signal before digital filtering is performed on a current limiting threshold according to some embodiments of the present invention.

Refer to FIG. 3. FIG. 3 is a waveform diagram of a power signal before digital filtering is performed on a current limiting threshold according to some embodiments of the present invention. As shown in FIG. 3, a processor 118 of a controlling circuit 106 repeatedly performs a constant power adaptive current limiting protection method at a refresh interval (for example, 1 microsecond). Therefore, a shortest update time for a current limiting threshold CT is a refresh interval, and the refresh interval is determined based on an operating clock of the processor 118. FIG. 3 shows a waveform relationship among an output voltage VO, an output current IO, and the current limiting threshold CT of a switching power supply circuit 102. Herein, a horizontal axis represents ordinal numbers of data points, which are not standardized to a unit of time. At each refresh time point, the processor 118 calculates the current limiting threshold CT based on the currently obtained output voltage VO. Before about a $150^{th}$ data point, the output voltage VO is 433 V, and the current limiting threshold CT calculated by the processor 118 is 10.85 A. At a $170^{th}$ data point, the output voltage VO changes to 375.6 V, and the current limiting threshold CT calculated by the processor 118 is 12.47 A. Compared with a previous refresh point, a variation difference of the current limiting threshold CT is 1.62 A. After another 1 microsecond, at a $237^{th}$ data point, the output voltage VO drops to 158.8 V, and the current limiting threshold CT calculated by the processor 118 is 24 A. Compared with the previous refresh point, the variation difference of the current limiting threshold CT is 11.53 A. At this point, the output current IO surges and generates great energy due to an instant increase in the current limiting threshold CT. Therefore, a pre-stage circuit of the switching power supply circuit 102 may quickly perform protection.

Figure 4:
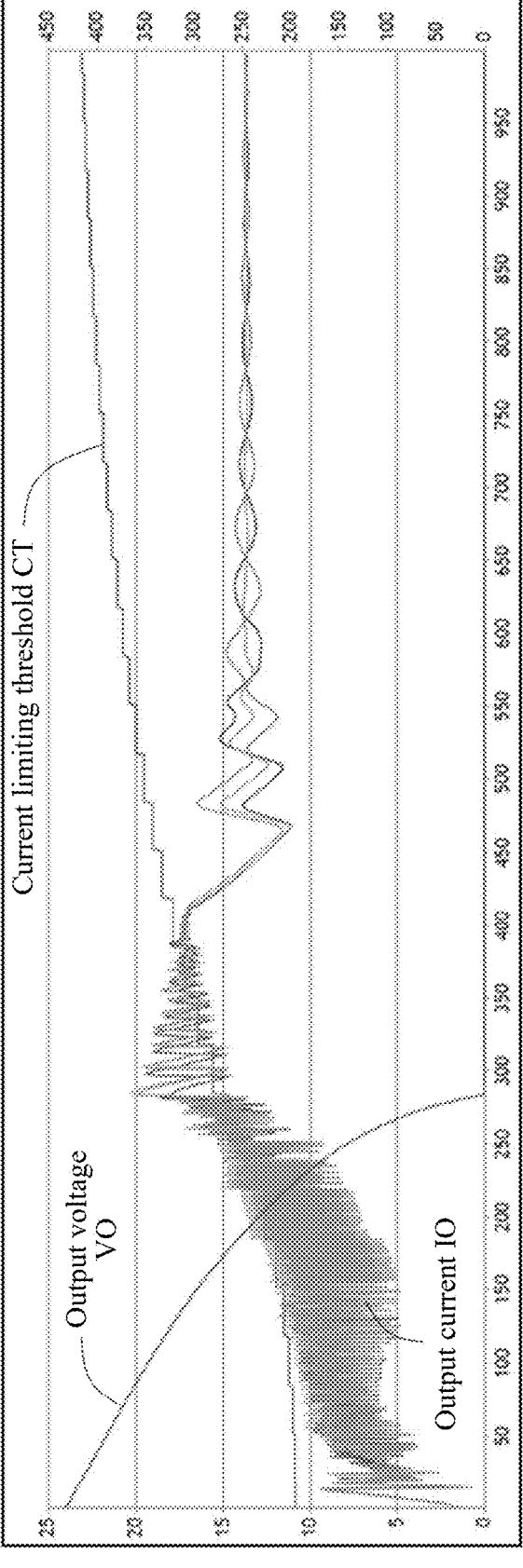
FIG. 4 is a waveform diagram of a power signal after digital filtering is performed on a current limiting threshold according to some embodiments of the present invention.

Refer to FIG. 4. FIG. 4 is a waveform diagram of a power signal after digital filtering is performed on a current limiting threshold according to some embodiments of the present invention. To avoid a drastic change in the current limiting threshold CT, in some embodiments, the controlling circuit 106 performs digital filtering on the current limiting threshold CT before the comparison between the output current IO and the current limiting threshold CT. It is to be noted that a processor 118 of the controlling circuit 106 performs digital filtering. A program related to digital filtering may be pre-stored in the processor 118. As shown in FIG. 4, the current limiting threshold CT obtained through the digital filtering changes slowly, and does not change drastically as shown in FIG. 3. When the processor 118 performs comparison based on the current limiting threshold CT obtained through the digital filtering, the output current IO does not exceed 20 A. Therefore, the pre-stage circuit does not trigger quick protection.

In some embodiments, when a plurality of switching power supply circuits 102 are provided, the controlling circuit 106 selectively executes the protecting action on each corresponding switching power supply circuit 102 based on the output current IO of each of the switching power supply circuits 102 and the current limiting threshold CT. Specifically, when the switching power supply circuit 102 adopts an interleaved design, the advantage is that the output current IO (an inductor current) may be used for cancellation to reduce a quantity of output ripples. In this embodiment, the detecting circuit 104 senses a corresponding one phase voltage and a corresponding one phase current (the phase voltage is an output voltage VO of each phase of the power supply, and the phase current is the output current IO of each phase of the power supply) respectively for each phase of the switching power supply circuit 102, and transmits the phase voltage and the phase current to the processor 118 of the controlling circuit 106, so that the processor 118 may calculate the current limiting threshold CT of each phase of a power supply based on a voltage and a protection power of each phase. The processor 118 further compares the current limiting threshold CT of the same phase of the power supply with the phase current, and initiates a protecting action for each phase of the power supply based on a result of comparison.

Figure 5:
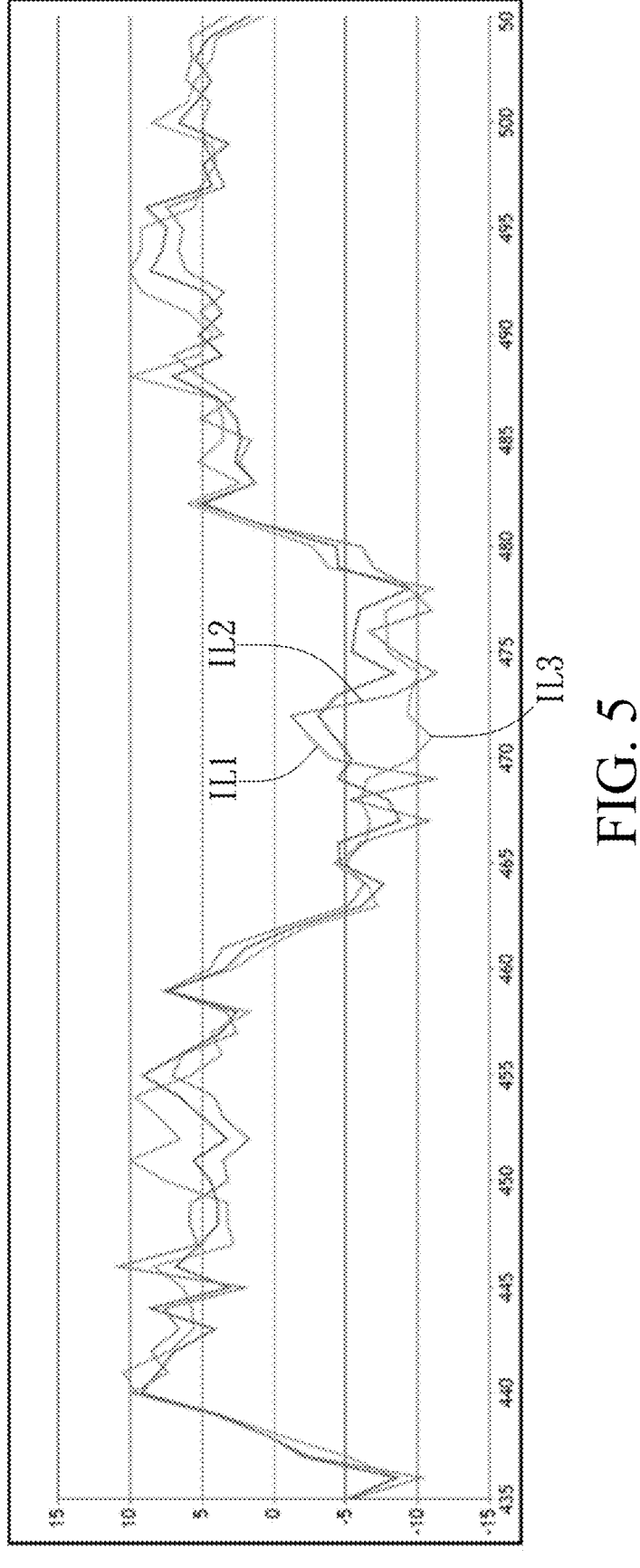
FIG. 5 is a diagram of waveforms of synchronous output currents of three phases when an external power supply is a three-phase power supply and a processing module executes a protecting action according to some embodiments of the present invention.
Figure 6:
FIG. 6 is a diagram of waveforms of asynchronous output currents of three phases when an external power supply is a three-phase power supply and a processing module executes a protecting action according to some embodiments of the present invention.

Refer to FIG. 2, FIG. 5, and FIG. 6 together. FIG. 5 is a diagram of waveforms of synchronous output currents of three phases when an external power supply is a three-phase power supply and a controlling circuit 106 executes a protecting action according to some embodiments of the present invention. FIG. 6 is a diagram of waveforms of asynchronous output currents of three phases when an external power supply is a three-phase power supply and a processing module executes a protecting action according to some embodiments of the present invention. The three-phase power supply shown in FIG. 5 adopts synchronous current limiting protection, and the three-phase power supply uses a single current limiting threshold CT for comparison. When an output current (IL1, IL2, or IL3) of any phase is greater than or equal to the current limiting threshold CT, the controlling circuit 106 performs a protecting action on the three-phase power supply. This may cause the output currents (IL1, IL2, IL3) of the three-phase power supply to be asynchronous (as shown in FIG. 5), resulting in a protection failure. In contrast, the three-phase power supply shown in FIG. 6 adopts asynchronous current limiting protection, and the three phases of the power supply are compared with the current limiting thresholds CT corresponding to the phases of the power supply. When the output current (IL1, IL2, IL3) of any phase is greater than or equal to the current limiting threshold CT, the controlling circuit 106 performs the protecting action only on the phase of the power supply that meets a triggering condition (without initiating protection for the remaining phase of the power supply), thereby avoiding interference between the phases of the power supply and ensuring consistency of the output currents (IL1, IL2, IL3) of three phases.

Refer to FIG. 7. FIG. 7 shows a power waveform of each phase of a power supply of a three-phase power supply in a comparative example. A comparative example is used herein to explain why the foregoing protection power is set to more than twice the maximum power of the switching power supply circuit 102. In this comparative example, the protection power is set to be less than twice the maximum power of the switching power supply circuit 102. A total power of the three-phase power supply is 18 kW, where the maximum power of each phase of the power supply is 6 kW. If the protection power is set to 10 KW (less than twice the maximum power), and the three-phase power supply operates in a fixed voltage mode, the load increases from 0 A to 10 A. At this point, a fixed voltage drops to 1558 V and cannot stabilize at 1600 V. It may be learned from power information of each phase of the power supply during the protecting action in FIG. 7 that a peak power measured by a first phase of the power supply P1 and a third phase of the power supply P3 instantly reaches the protection power of 10 kW, because the controlling circuit 106 compares the current limiting thresholds CT of the three phases of the power supply (P1, P2, P3) to execute the protecting action. Therefore, the protection time of each phase of the power supply (P1, P2, P3) is different, and at this point, energy of the three phases of the power supply (P1, P2, P3) is transferred among the three phases. In contrast, if the protection power of each phase of the power supply is set to 12 kW (twice the maximum power of 6 W), then each phase of the power supply (P1, P2, P3) is to stabilize at 1600 V. Specifically, for the current limiting threshold CT, impact of the instantaneous tension load and measurement noise needs to be considered. It may be understood that although the three-phase power supply is used for description herein, a single-phase power supply is still applicable due to the similar consideration.

Refer to FIG. 1, FIG. 2, and FIG. 8 together. FIG. 8 is a flowchart (1) of a constant power adaptive current limiting protection method according to some embodiments of the present invention. In some embodiments, the constant power adaptive current limiting protection method S80 includes: receiving, by a controlling circuit 106, a detection result of a detecting circuit 104, where the detection result indicates an output voltage VO and an output current IO of a switching power supply circuit 102 (step S802); obtaining, by the controlling circuit 106, a current limiting threshold CT based on a protection power and the output voltage VO (step S804); and selectively executing, by the controlling circuit 106, a protecting action based on comparison between the output current IO and the current limiting threshold CT (step S806). It is to be noted that the constant power adaptive current limiting protection method S80 is applicable to an existing device having the switching power supply circuit 102. After the detecting circuit 104 and the controlling circuit 106 are coupled to the switching power supply circuit 102, the controlling circuit 106 may perform the constant power adaptive current limiting protection method S80.

In some embodiments, before step S806 is performed, the method further includes: performing, by the controlling circuit 106, digital filtering on the current limiting threshold CT (step S808). Therefore, after programmed digital filtering is performed on the current limiting threshold CT, a variation of the current limiting threshold CT may slowly change, so as to prevent the switching power supply circuit 102 from triggering pre-stage protection as a result of a sudden and rapid increase in the output current IO due to an excessive change between a previous current limiting threshold and the present current limiting threshold CT.

In some embodiments, step S806 may include: determining, by the controlling circuit 106, that the output current IO is greater than or equal to the current limiting threshold CT to adjust the PWM signal S1 (step S810). When the output current IO is greater than or equal to the current limiting threshold CT, the controlling circuit 106 may adjust the PWM signal S1, so as to limit the output power of the switching power supply circuit 102 to below the protection power.

Figure 9:
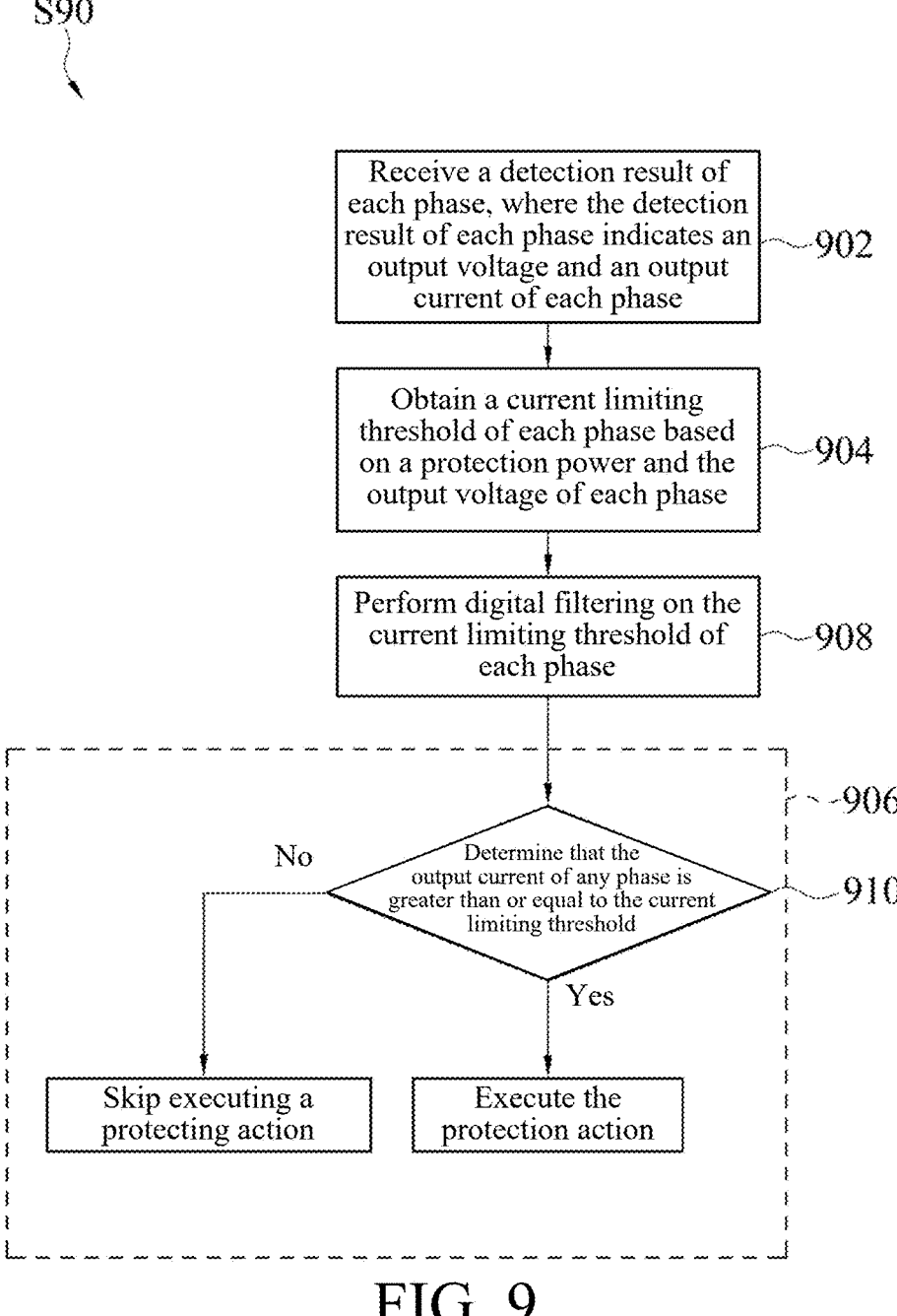
FIG. 9 is a flowchart (2) of a constant power adaptive current limiting protection method according to some embodiments of the present invention.

Refer to FIG. 1, FIG. 2, and FIG. 9 together. FIG. 9 is a flowchart (2) of a constant power adaptive current limiting protection method according to some embodiments of the present invention. As shown in FIG. 1, FIG. 2, and FIG. 9, in some embodiments, the constant power adaptive current limiting protection method S90 includes: receiving, by the controlling circuit 106, a detection result of each phase of the detecting circuit 104, where a detection result of each phase indicates the output voltage VO and the output current IO of the switching power supply circuit 102 of each phase (step S902); obtaining, by the controlling circuit 106, a current limiting threshold of each phase of the power supply based on the protection power and the output voltage VO of the switching power supply circuit 102 of each phase (step S904); and selectively executing, by the controlling circuit 106, a protecting action on the switching power supply circuit 102 of each phase based on the output current IO and the current limiting threshold CT of the switching power supply circuit 102 of each phase (step S906). In this embodiment, if the switching power supply circuit 102 adopts an interleaved design, the controlling circuit 106 may calculate the current limiting threshold of each phase of the power supply based on a voltage and the protection power of each phase. The controlling circuit 106 may further compare the current limiting threshold CT of the same phase of the power supply with the phase current, and initiate the protecting action on each phase of the power supply based on the result of comparison.

In some embodiments, before step S906 is performed, the method further includes: performing, by the controlling circuit 106, digital filtering on the current limiting threshold CT of each phase (step S908). Therefore, after programmed digital filtering is performed on the current limiting threshold CT of each phase, a variation of the current limiting threshold CT of each phase may slowly change, so as to prevent the switching power supply circuit 102 from triggering pre-stage protection due to a sudden and rapid increase in the output current IO of each phase as a result of an excessive change between a previous current limiting threshold CT and the present current limiting threshold CT.

In some embodiments, step S906 may include: determining, by the controlling circuit 106, that the output current IO of any phase is greater than or equal to the current limiting threshold CT to adjust the PWM signal S1 corresponding to the phase of the power supply (step S910). When the output current IO of any phase is greater than or equal to the current limiting threshold CT, the controlling circuit 106 may adjust the PWM signal S1 corresponding to the phase of the power supply, so as to limit the output power of the switching power supply circuit 102 corresponding to the phase of the power supply to below the protection power.

Based on the above, through the constant power adaptive current limiting protection circuit 10 provided in some embodiments of the present invention, the current limiting threshold CT may be adaptively updated based on an actual output state, so as to accordingly determine whether to execute the protecting action. In addition, when the protecting action needs to be executed, the output power of the power signal S2 is limited to below the protection power. In this way, the following advantages may be provided. First, during the execution of the protecting action, instead of shutting down the entire device, the output current IO is limited to below the current limiting threshold CT, so that the output power of the power signal S2 does not exceed the protection power and a normal operation is maintained. Second, the current limiting threshold CT is calculated based on the output voltage VO and protection power. This overcurrent protection mechanism may be applied to various devices with power ratios (including more than 4 times the power ratio), and therefore may be widely used for operation under different voltage conditions or different current conditions. Third, during the execution of the protecting action, the output power does not exceed the protection power. Therefore, an instantaneous power of the overall instrument may be reduced, and the stress of a safe operating area (SOA) of an element may also be reduced.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A constant power adaptive current limiting protection circuit, comprising:

a switching power supply circuit, having at least one power switch assembly and an output terminal, wherein the at least one power switch assembly is operated by a pulse-width modulation (PWM) signal to cause the output terminal to output a power signal;

a detecting circuit, coupled to the output terminal of the switching power supply circuit to detect an output voltage and an output current of the power signal; and a controlling circuit, coupled to the switching power supply circuit and the detecting circuit, and configured to: output the PWM signal, calculate a current limiting threshold based on a protection power and the output voltage, and selectively execute a protecting action based on comparison between the output current and the current limiting threshold, wherein the protecting action is adjusting the PWM signal, so as to limit the output power of the switching power supply circuit to below the protection power.

2. The constant power adaptive current limiting protection circuit according to claim 1, wherein when the output current is greater than or equal to the current limiting threshold, the controlling circuit is configured to adjust the PWM signal, so as to limit the output power to below the protection power.

3. The constant power adaptive current limiting protection circuit according to claim 1, wherein the controlling circuit is configured to perform digital filtering on the current limiting threshold before the comparison between the output current and the current limiting threshold.

4. The constant power adaptive current limiting protection circuit according to claim 1, wherein the protection power is more than twice a maximum power of the switching power supply circuit.

5. The constant power adaptive current limiting protection circuit according to claim 1, wherein when a plurality of switching power supply circuits are provided, the controlling circuit is configured to selectively execute the protecting action on each corresponding switching power supply circuit based on the output current of each of the switching power supply circuits and the current limiting threshold.

6. A constant power adaptive current limiting protection method, comprising:

receiving, by a controlling circuit, a detection result of a detecting circuit, wherein the detection result indicates an output voltage and an output current of a switching power supply circuit;

obtaining, by the controlling circuit, a current limiting threshold based on a protection power and the output voltage; and selectively executing, by the controlling circuit, a protecting action based on comparison between the output current and the current limiting threshold, wherein the protecting action is adjusting a PWM signal, so as to limit an output power of the switching power supply circuit to below the protection power.

7. The constant power adaptive current limiting protection method according to claim 6, wherein when the output current is greater than or equal to the current limiting threshold, the controlling circuit is configured to adjust the PWM signal, so as to limit the output power to below the protection power.

8. The constant power adaptive current limiting protection method according to claim 6, wherein before performing a step of selectively executing, by the controlling circuit, the protecting action based on comparison between the output current and the current limiting threshold, the method further comprises: performing, by the controlling circuit, digital filtering on the current limiting threshold.

9. The constant power adaptive current limiting protection method according to claim 6, wherein the protection power is more than twice a maximum power of the switching power supply circuit.

10. The constant power adaptive current limiting protection method according to claim 6, wherein when a plurality of switching power supply circuits are provided, the controlling circuit is configured to selectively execute the protecting action on each corresponding switching power supply circuit based on the output current of each of the switching power supply circuits and the current limiting threshold.

* * * * *